(12) United States Patent
Sugino et al.

(10) Patent No.: US 7,110,177 B2
(45) Date of Patent: Sep. 19, 2006

(54) POLARIZING FILM AND IMAGE DISPLAY

(75) Inventors: Youichirou Sugino, Ibaraki (JP);
Hisashi Mihara, Ibaraki (JP);
Kazuhiro Higashio, Ibaraki (JP);
Seiichi Kusumoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 144 days.

(21) Appl. No.: 10/347,286

(22) Filed: Jan. 21, 2003

(65) Prior Publication Data
US 2003/0137732 A1 Jul. 24, 2003

(30) Foreign Application Priority Data
Jan. 18, 2002 (JP) ........................ 2002-009462

(51) Int. Cl.
*G02B 5/30* (2006.01)
*B29D 7/01* (2006.01)
*B29D 9/00* (2006.01)
*G02F 1/1335* (2006.01)

(52) U.S. Cl. .................. 359/491; 359/485; 359/490; 359/900; 264/1.31; 264/1.34; 264/1.35; 349/96

(58) Field of Classification Search .............. 359/485, 359/490, 491, 492, 900; 349/96; 264/1.31, 264/1.34, 1.35
See application file for complete search history.

(56) References Cited

U.S. PATENT DOCUMENTS 5,312,568 A * 5/1994 Bastiaansen ............... 264/1.34
5,523,863 A 6/1996 Fergason .................... 359/52
6,049,428 A 4/2000 Khan et al. ................ 359/491
6,252,639 B1 * 6/2001 Giannatto ................... 349/58
6,404,469 B1 * 6/2002 Kitagawa et al. ........... 349/96
2002/0015807 A1 2/2002 Sugino et al. ............. 428/1.31

FOREIGN PATENT DOCUMENTS

| EP | 1 160 591 | | 12/2001 |
|----|-----------|---|---------|
| JP | 3-503322 | | 7/1991 |
| JP | 09-113727 A | * | 5/1997 |
| JP | 11-052349 A | * | 2/1999 |
| JP | 2001-055402 A | * | 2/2001 |
| JP | 2001-272544 A | * | 10/2001 |
| JP | 2001-343529 | | 12/2001 |
| JP | 2002-6133 | | 1/2002 |
| JP | 2002-174727 | | 6/2002 |

OTHER PUBLICATIONS

Y. Bobrov, et al., "Thin film polarizers for liquid crystal displays", Proc. PSIE 4511, pp. 133–140, (2001).*
J. M. Bennett, et al. "Basic Relations for Polarizers", Handbook of Optics, Section 10.3, W.G. Driscoll, ed., McGraw–Hill Book Co., ©1978.*

* cited by examiner

Primary Examiner—John Juba, Jr.
(74) Attorney, Agent, or Firm—Westman, Hattori, Daniels & Adrian LLP

(57) ABSTRACT

The present invention provides a polarizing film or a polarizer that has an elastic modulus of at most about 3500 N/mm$^2$ and suppresses occurrence of warping, the polarizing film is obtained by adsorbing a dichroic material in a polyvinyl alcohol-based film 20 μm in thickness and stretching the tilin. The polarizing film has a transmittance of at least 43% and a polarization degree of at least 98%. A transparent protective layer is laminated on at least one surface of the polarizing film to form a polarizing plate.

32 Claims, 1 Drawing Sheet

POLARIZING FILM AND IMAGE DISPLAY

BACKGROUND OF THE INVENTION

1. Field of the Invention

The present invention relates to a polarizing film used for various image display units such as a liquid crystal display (hereinafter, abbreviated as 'LCD').

2. Description of the Related Art

LCDs have been used widely for, e.g., desk calculators, electronic clocks, personal computers, word processors, and instruments of automobiles and machines. Recently, demand for LCDs has been increased rapidly, leading to a further requirement for large, light-weighted and thin panels.

In general, such a LCD includes a polarizing plate as a laminate of a polarizer and a transparent protective layer for visualizing a variation in orientation of its liquid crystal. The polarizing plate has a great influence on the display characteristics of the LCD. However, conventional polarizing plates has a problem of instability in size, i.e., the size of the polarizing plate can vary considerably under a heated or humidified condition. The variation in size will exert a force on the polarizing plate, thereby the liquid crystal panel will be warped during a use of the liquid crystal display. Consequently, the display characteristics deteriorate, for example, the transmittance of the in-plane panel varies.

It is required to suppress variation in size of the polarizing plate for solving the problem. However, since typical polarizing plates currently used are made of plastic films, such variations in size are difficult to prevent perfectly.

SUMMARY OF THE INVENTION

An object of the present invention is to provide a polarizing film that can suppress occurrence of warping when used for any of various image displays such as a liquid crystal display.

In an aspect of the present invention, a polarizing film of the present invention has an elastic modulus of at most about 3500 N/mm$^2$. It is preferable that the polarizing film of the present invention includes a stretched film and that a dichroic material is adsorbed in the stretched film.

As a result of keen studies for solving the above-described problems of the conventional films, the inventors noticed that a product of size variation (area variation) of a polarizing film and the elastic modulus can represent a force generated due to change in size in the polarizing film, for example, the polarizer or a polarizing plate including the polarizer and a transparent protective layer. It was found that even if the area variation of the polarizing film is difficult to suppress, suppression of the elastic modulus serves to decrease the force exerted at the time of the size variation. When the elastic modulus of the polarizing film is about 3500 N/mm$^2$ or less, the above-described force exerted at the time of the size variation can be decreased sufficiently. The polarizing film according to the present invention can reduce loads applied onto a liquid crystal cell even when the film is arranged on the surface of the liquid crystal cell, thereby suppressing warping of the liquid crystal panel so as to solve deficiencies such as unevenness of the image display screen.

The force exerted at the time of the size variation can be represented depending on its area variation, as shown in the following formula:

Force (N) generated during size variation=area variation of the polarizing film (mm$^2$)×elastic modulus of the polarizing film (N/mm$^2$).

In the formula, the area variation can be calculated in the following manner. For example, in the case that the absorption axis angle of the film is 0°, a specimen being 100 mm (parallel to MD direction)×100 mm (parallel to Td direction) in size is prepared. This specimen is heated at 80° C. for 24 hours or heat-humidified at 60° C./90% RH for 24 hours and left for a certain time (e.g., a time required for cooling the film to room temperature) before a measurement of the length in the MD direction and TD direction. The area of the polarizing film is calculated before and after the heat-humidifying treatment and substituted in the following formula so as to obtain the area variation. In the following formula, 'A' denotes an area of the polarizing film before heating or heat-humidifying, while 'B' denotes an area of the polarizing film after heating or heat-humidifying.

Area variation (mm$^2$)=A−B

The polarizing film according to the present invention is not limited about its form specifically as long as the elastic modulus is within the above-described range. In a particular embodiment, the polarizing film includes a stretched film, such as a stretched film in which a dichroic material is adsorbed. For example, it can be a monolayer exclusively composed of the above-described stretched film; it can be a laminate including an additional member with the stretched film. Specifically, the monolayer exclusively composed of the stretched film can be used as a polarizer. The laminate can be, for example, a polarizing plate including the stretched film as a polarizer and further a transparent protective layer, and the transparent protective layer is laminated on at least one surface of the polarizer.

A liquid crystal panel according to the present invention includes a liquid crystal cell and a polarizing film of the present invention, and the polarizing film is arranged on at least one surface of the liquid crystal cell. A liquid crystal display according to the present invention includes a liquid crystal panel, and the liquid crystal panel is of the present invention. Consequently, a polarizing film of the present invention, which is arranged on a surface of a liquid crystal cell, serves to decrease force exerted at the time of size variation caused by heating or heat-humidifying. Thereby, warping of the liquid crystal panel is suppressed, so that the display will gave excellent display characteristics when used in a liquid crystal display or the like.

DETAILED DESCRIPTION OF THE INVENTION

Figure 1:
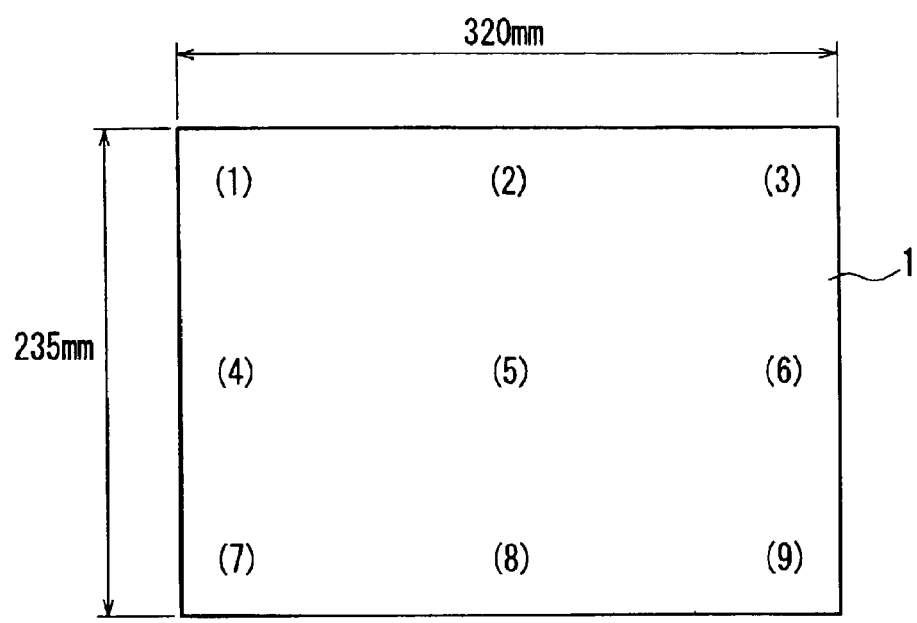
FIG. 1 is a plan view showing a position of points for measuring brightness of a polarizing plate in one embodiment of the present invention.

As described above, a polarizing film according to the present invention has an elastic modulus of at most about 3500 N/mm$^2$.

Since a force exerted on the polarizing film at the time of size change is increased when the elastic modulus exceeds about 3500 N/mm$^2$, the polarizing film may increase distortion (warping) of a liquid crystal panel. A polarizing film according to the present invention having an elastic modulus of the above-described range is useful in solving such a problem. It is preferable that the elastic modulus is at most about 2800 N/mm$^2$, or more preferably, at most about 2300 N/mm$^2$, and particularly preferably, at most about 2000 N/mm$^2$.

A measurement of the elastic modulus will be mentioned in the following Examples.

It is preferable that the polarizing film of the present invention has a transmittance of at least about 43%, more preferably the transmittance is in a range of about 43.0% to about 45.5%, and particularly preferably in a range of about 43.3% to about 45.0%. It is preferable that the polarization degree is at least about 98%, and more preferably, in a range of about 99.0% to 100%, and particularly preferably in a range of about 99.5% to 100%. Measurement of the transmittance and the polarization degree will be described below in the Examples.

In the present invention, a polarizing film (hereinafter, the film may be referred to as 'polarizer') can be made of a polymer film. The polarizing film includes a stretched film in which a dichroic material is adsorbed. Specifically, it can be made by swelling the polymer film, and dyeing the film by adsorbing a dichroic material such as iodine or a dichroic dye, and further crosslinking, stretching and drying the film.

Examples of the polymer film include a polyvinyl alcohol (PVA)-based film, a partially formalized PVA-based film, a polyethylene terephthalate (PTFE)-based film, a film based on ethylene-vinyl acetate copolymer, and partially-saponified films thereof, and hydrophilic polymer films such as a cellulosic film. The PVA polymer can be prepared, for example, by copolymerizing with vinyl acetate a small amount of monomer that can be copolymerized with the vinyl acetate, e.g., unsaturated carboxylic acid and unsaturated sulfonic acid. Alternatively, polyene oriented films of dehydrated PVA and dehydrochlorinated polyvinyl chloride can be used as well. Among them, a PVA-based film is advantageous, as it has an excellent dye-affinity provided by iodine as a dichroic material as mentioned below.

The polymer composing the film has a polymerization degree of, for example, ranging from about 500 to about 10000, preferably from about 1000 to about 6000, more preferably from about 1500 to about 5000. As for a saponified film, it is preferred the saponification degree is at least about 75 mol in light of the solubility in water, or more preferably, it is at least about 98 mol, and particularly preferably, the saponification degree ranges from about 98.3% to about 99.8%.

The polarizer in the present invention is obtained by stretching an unstretched film. It is preferable that the film before stretching has a thickness of at most 50 μm, more preferably, a thickness ranging from 5 μm to 40 μm, and particularly preferably from 5 μm to 35 μm. The elastic modulus of the formed polarizing film was set to the above-described value or lower by setting the thickness of the unstretched film to 50 μm. The above-described warping can be prevented by using polarizing films manufactured under the above-described condition as polarizing plates used in various image displays.

It is preferable that the finally obtained polarizer has a thickness of, for example, at most 20 μm, more preferably the thickness ranges from 1 μm to 18 μm, and particularly preferably from 1 μm to 15 μm. When the thickness is at most 20 μm, the force exerted on the polarizer due to stretching and drying can be reduced sufficiently. This serves to sufficiently suppress contraction of the polarizer under a stress caused by heating, humidifying or the like, loading to the transparent protective layer is reduced further, so that the force exerted on the entire polarizing plate can be decreased sufficiently at the time of dimensional change.

A final (total) stretch ratio of the polarizer can be determined appropriately depending on thickness of the unstretched film, desired thickness of the formed polarizer, or the like. It is preferable that the ratio ranges from about 3.0 to about 7.0 in the stretching direction (MD direction) with respect to the unstretched film, and more preferably, the ratio ranges from about 5.5 to about 6.0.

The following description is about a method of producing a polarizer for a polarizing film of the present invention. As described above, the polarizer can be produced by swelling, dyeing, crosslinking and stretching (e.g., uniaxial stretching) and drying the polymer film. The respective steps of dyeing, crosslinking and stretching can be carried out separately or simultaneously, and the order of the steps can be determined arbitrarily. A specific description follows. The polarizing film of the present invention will not be limited to a film produced in the following method as long as the elastic modulus satisfies the above conditions.

(1) Swelling Treatment

The polymer film is impregnated in a swelling bath for swelling and stretching. The polymer film has a thickness of at most 50 μm as described above, or more preferably, the thickness ranges from 5 μm to 40 μm, particularly preferably from 5 μm to 35 μm.

For the swelling bath, water, an aqueous solution of glycerol, an aqueous solution of potassium iodide or the like, can be used. Among them, water is preferred. It is preferable for the aqueous solution of glycerol that the concentration is at most 5 wt %, and for the aqueous solution of potassium iodide, the concentration is at most 10 wt %. It is preferable that the temperature of the swelling bath ranges from 20° C. to 45° C., more preferably from 25° C. to 40° C., particularly preferably from 27° C. to 37° C. Though the time for impregnation in the swelling bath is not limited specifically, preferably it ranges from 2 seconds to 180 seconds, more preferably from 10 seconds to 150 seconds, and particularly preferably from 60 seconds to 120 seconds.

Alternatively, the swelling treatment can be skipped and the following step of dyeing can be carried out.

(2) Dyeing Treatment

The polymer film is pulled out of the swelling bath, impregnated in a dyebath containing a dichroic material, and further stretched uniaxially in the dyebath. That is, the film is impregnated for adsorbing the dichroic material and the stretching carried out for orienting the dichroic material in one direction.

Any of well-known materials can be used for the dichroic material. The examples include iodine and organic dyestuffs. Examples of the organic dyestuffs include Red BR, Red LR, Red R, Pink LB, Rubine BL, Bordeaux GS, Sky blue LG, Lemon yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo red, Brilliant violet BK, Suprablue G, Suprablue GL, Direct sky blue, Direct first orange S, First black, and Supraorange GL. Among these dichroic materials, for example, iodine is preferably used to provide high transmittance and high polarization degree.

Each of these dichroic materials can be used alone or combined with at least one of the remaining dichroic materials. The organic dyestuff can be used preferably in a state combined with at least one of other dyestuffs for neutralization of the visible ray region. Specific examples of the combinations include a combination of Congo red and Suprablue G, Supraorange GL and Direct sky blue, and Direct sky blue and First black.

The solution for the dyebath can be prepared by dissolving the dichroic material in a solvent. For example, water can be used for the solvent, and an organic solvent compatible with water can be included. Though the concentration of the dichroic material in the solution is not limited specifically, preferably it ranges from about 0.01 wt % to about 10 wt %, more preferably from about 0.02 wt % about 7 wt %, and particularly preferably from about 0.025 wt % to about 5 wt %.

When iodine is used for the dichroic material, it is preferable to add an iodide as an auxiliary for improving the dyeing efficiency. Examples of the iodide include potassium iodide, lithium iodide, sodium iodide, zinc iodide, aluminum iodide, lead iodide, copper iodide, barium iodide, calcium iodide, tin iodide, and titanium iodide. Any of these iodides will be added to the dyebath preferably in a range of about 0.05 wt % to about 10 wt %, more preferably in a range of about 0.10 wt % to about 5 wt %.

When iodine and potassium iodide are combined in use, a preferable ratio (weight ratio) of the iodine to potassium iodide in the solution is, for example, from about 1:5 to about 1:100, more preferably from about 1:7 to about 1:50, and particularly preferably from about 1:10 to about 1:30.

Though the time for impregnating the polymer film in the dyebath is not limited specifically, it preferably ranges from about 1 minute to about 20 minutes, more preferably from about 1.2 minutes to about 15 minutes, and particularly preferably from about 2 minutes to about 10 minutes. A preferable range for the temperature of the dyebath is, for example, from about 5° C. to about 42° C., more preferably from about 10° C. to about 35° C., and particularly preferably from about 12° C. to about 30° C. Preferably, this temperature is decided to be lower than the temperature for the swelling treatment by a range of about 3° C. to about 15° C., more preferably a range of about 5° C. to about 12° C., particularly preferably, a range of about 8° C. to about 10° C.

In pulling the polymer film out of the bath, dropping of the solution can be removed, for example, by using a known draining roller. Alternatively, the solution can be removed by applying the film to a plate and by using an air knife. The draining treatment can be used in the subsequent steps as well.

The dyeing process is not limited to the above-described impregnation. Alternatively, the polymer film can be stretched while being coated or sprayed with an aqueous solution containing a dichroic material. The method of stretching is not limited specifically, but the polymer film can be stretched while appropriately adjusting tensile force applied thereto.

(3) Crosslinking Treatment

The polymer film is pulled out from the dyebath, impregnated in a crosslinking bath containing a crosslinking agent, and further stretched in the crosslinking bath. The crosslinking treatment is performed to retain the running stability.

The crosslinking agent can be selected from known materials like iodides such as boric acid, borax, glyoxal, and glutaraldehyde. These materials can be used alone or can be combined with at least any one of the remaining materials. In combination of at least two kinds of materials, boric acid and borax are combined preferably, and a preferable ratio of the addition (molar ratio) is from about 4:6 to about 9:1, more preferably from about 5.5:4.5 to about 7:3, and particularly preferably about 6:4. The solution for crosslinking bath can be prepared by dissolving the crosslinking agent in a solvent. In an example, the solvent can be water, and it can further contain an organic solvent compatible with water.

Though the concentration of the crosslinking agent in the solution is not limited specifically, preferably, it ranges from about 1 wt % to about 10 wt %, more preferably from about 1.5 wt % to about 8 wt %, and particularly preferably from about 2 wt % to about 6 wt %.

In order to provide in-plane homogeneous properties to the polarizer, the solution containing crosslinking agent can contain an auxiliary of iodide such as potassium iodide, lithium iodide, sodium iodide, zinc iodide, aluminum iodide, lead iodide, copper iodide, barium iodide, calcium iodide, tin iodide, and titanium iodide, in addition to the boric acid compound. The content of the auxiliary in the solution is, for example, from 0.05 wt % to 15 wt %, preferably from 0.5 wt % to 8 wt %.

A combination of boric acid and potassium iodide is particularly preferred. A preferable range for a ratio (weight ratio) of the boric acid to the potassium iodide in the solution is, for example, from about 1:0.1 to about 1:3.5, more preferably, from about 1:0.2 to about 1:3, and particularly preferably from about 1:0.5 to about 1:2.5.

The temperature for the crosslinking bath generally ranges from about 20° C. to about 70° C. Though the time for impregnating the polymer film is not limited specifically, it generally ranges from about 1 second to about 15 minutes, preferably from about 5 seconds to about 10 minutes.

As described above, the stretching during the crosslinking can be carried out, for example, by impregnating the polymer film in the crosslinking bath. Alternatively, as described for the dyeing treatment, the polymer film in a relaxed state can be stretched while being coated or sprayed with the solution containing the crosslinking agent. The stretching process is not limited specifically. For example, tensile force applied to the film can be adjusted appropriately, or the film can be stretched at a fixed stretch ratio. These processes can be carried out more than once, or plural processes can be carried out. The tensile force can be adjusted appropriately corresponding to the kind of the crosslinking agent, the temperature of the crosslinking bath and the content of the crosslinking agent, the kind of the polymer film and an average degree of polymerization.

(4) Stretching Treatment

The polymer film is pulled out from the crosslinking bath, impregnated in a stretching bath, and further stretched in this stretching bath.

Though the solution for the stretching bath is not limited specifically, it is selected, for example, from solutions containing boric acid, potassium iodide, various metal salts and other iodides, and zinc compounds. The solvent can be, water, ethanol, or the like. Specifically, it is preferable that the solution contains boric acid and potassium iodide. Preferably, a total content of these materials ranges from about 2 wt % to about 18 wt %, more preferably from about 4 wt % to about 17 wt %, and particularly preferably from about 6 wt % to about 15 wt %. The ratio (weight ratio) of the boric acid to potassium iodide ranges, for example, from about 1:0.1 to about 1:4, more preferably from about 1:0.2 to about 1:3.5, and particularly preferably from about 1:0.5 to about 1:3.

A preferable range of the temperature of the stretching bath is from about 40° C. to about 67° C., more preferably from about 45° C. to about 65° C., and particularly preferably from about 50° C. to about 62° C.

(5) Washing Treatment

The polymer film is pulled out of the stretching bath, impregnated in an iodide-containing solution, washed with water, and dried so as to produce a polarizer.

The above-described iodides can be added to the solution. Potassium iodide and sodium iodide are especially preferred. In general, the solvent can be water. Residue of the boric acid used in the stretching treatment can be washed out from the polymer film by using the solution containing iodide.

When the solution contains potassium iodide, the concentration ranges, for example, from about 1 wt % to about 8 wt %, preferably from about 2 wt % to about 7 wt %, and particularly preferably from about 3 wt % to about 5 wt %. It is preferable that the temperature of the aqueous solution ranges from about 15° C. to about 40° C., more preferably from about 20° C. to about 37° C., and particularly preferably from about 25° C. to about 35° C.

Though the number of washing with water after the impregnation in the solution containing potassium iodide is not specifically limited, preferably it is from 1 to 5, more preferably from about 1 to 4, and particularly preferably 2 or 3.

The film can be subjected to natural drying, air-drying, heating or the like without any specific limitations. In a case of heating, a preferable temperature range is from about 25° C. to about 45° C., more preferably from about 26° C. to about 42° C., and particularly preferably from about 28° C. to about 38° C.

The film can be stretched in the respective steps, and there is no specific limitation about the stretch ratio in each of the steps. However, it is preferable that a stretched film has a final stretch ratio in a range of about 3.0–7.0 in the stretching direction (MD direction) with respect to the unstretched film. More preferably, the range is from about 5.5 to 6.0.

Among these steps, dyeing, stretching and crosslinking can be carried out separately or simultaneously. A washing step can be included in each of the steps.

The above-described methods are not limitative, but, for example, the film can be dry-stretched. It is preferable the final stretch ratio in this case is substantially same the above-described range.

Similar polarizers can be formed, for example, by mixing a dichroic material in a polyethylene terephthalate (PET) for forming a film to be stretched. Alternatively, a polarizer can be formed by stretch-orienting a polyvinylene-based film or by further mixing a dichroic material in the film. Alternative examples include an O-type polarizer (U.S. Pat. No. 5,523, 863 and Tokuhyo-3(1991)-503322 (published Japanese translation of PCT international publication for patent application)) where a dichroic dyestuff is mixed in a uniaxially-oriented liquid crystal and an E-type polarizer using a dichroic lyotropic liquid crystal (U.S. Pat. No. 6,049,428).

As described above, the polarizing film according to the present invention can be a laminate including the polarizer. The laminate can be the above-described polarizing plate, specifically, it can be a polarizing plate or the like including the polarizer and the transparent protective layer that is laminated on at least one surface of the polarizer, and the elastic modulus is about 3500 N/mm$^2$ or less.

In the present invention, the transparent protective layer can be arranged on either or both surfaces of the polarizer.

The transparent protective layer can be selected from known transparent protective films without any specific limitations. Preferably, it is a polymer film excellent in some characteristics such as transparency, mechanical strength, thermal stability, moisture shielding property, and isotropism. Specific examples of materials for the transparent protective layer include cellulose-based resins such as triacetylcellulose, and transparent resins based on e.g., polyester, polycarbonate, polyamide, polyimide, polyethersulfone, polysulfone, polystyrene, polynorbornene, polyolefin, acrylic substances, and acetate. Resins that will be cured by heat or ultraviolet rays, which is based on e.g., acrylic substances, urethane, acrylic urethane, epoxy, and silicones, can be used as well. Among them, a TAC film having a surface saponified with alkali or the like is preferred in light of the polarization property and durability.

Another example of a polymer film is described in JP 2001-343529 (WO 01/37007). The polymer material used can contain a composition of a thermoplastic resin having a side chain including a substituted or unsubtituted imido group and a thermoplastic resin having a side chain including a substituted or unsubstituted phenyl group and nitryl group. An example is a resin composition containing an alternating copolymer of isobutene and N-methylene maleimide and an acrylonitrile-styrene copolymer. Alternatively, the polymer film can be formed by extruding the resin composition.

It is preferable that the protective layer is colorless. Specifically, it is preferable that a phase contrast value (Rth) of the film in the thickness direction as represented by the following equation is in a range of −90 nm to +75 nm. More preferably, it is from −80 nm to +60 nm, and particularly preferably from −70 nm to +45 nm. When the phase contrast is within the range of −90 nm to +75 nm, coloring (optical coloring) of the polarizing plate, which is caused by the protective film, can be solved.

$$Rth=[(nx+ny)/2-nz]\cdot d$$

In the above-described equation, 'd' denotes a thickness of the protective layer, while nx, ny and nz respectively denote refractive indices of X-axis, Y-axis and Z-axis in the protective layer. The X axis denotes an axial direction presenting an in-plane maximum refractive index within the protective layer, the Y-axis denotes an in-plane axial direction perpendicular to the X-axis, and the Z-axis denotes a thickness direction perpendicular to the X-axis and the Y-axis.

The transparent protective layer can have an optically compensating function. Such a transparent protective layer having the optically compensating function can be a known layer used for preventing coloring or for widening a preferable visual angle that will be caused by changes in the visual angles, based on a phase difference. Specific examples include various films of the above-described transparent resins that is stretched uniaxially or biaxially, an oriented film of a liquid crystal polymer or the like, and a laminate having a transparent substrate and an oriented layer of e.g., a liquid crystal polymer. An oriented film of the liquid crystal polymer is advantageous especially since it can provide a wide visual angle with excellent visibility. Particularly advantageous is an optically compensating retardation plate including an optically compensating layer supported by a triacetylcellulose film, where the optically compensating layer is made of an incline-oriented layer of a discotic or nematic liquid crystal polymer. This optically compensating retardation plate is supplied, for example, as 'WV film' by Fuji Photo Film Co., Ltd or the like. Alternatively, the optically compensating retardation plate can be prepared by laminating two layers or more of the retardation film and a film supporter of triacetylcellulose film or the like so as to control the optical characteristics such as a phase difference.

The thickness of the transparent protective layer is not limited specifically but it can be determined appropriately depending on some factors such as the phase difference and protection strength. In general, the thickness is at most 5 mm, and advantageously at most 1 mm and further advantageously, it is in a range of 1 μm to 500 μm and particularly advantageously it is in a range of 5 μm to 150 μm.

The transparent protective layer can be prepared appropriately according to any known methods such as coating of the transparent resin on the polarizer and laminating of e.g., the transparent resin film or the optically compensating retardation plate on the polarizer. Commercial products can be used as well.

A transparent protective film used for the protective layer can be treated to provide characteristics such as hard coating, antireflection, anti-sticking, diffusion and anti-glaring. Hard coating treatment is applied, for example, to prevent scratches on the surfaces of the polarizing plate. For example, a surface of the transparent protective film can be applied with a coating film of a cured resin with excellent hardness and smoothness. The cured resin can be selected from ultraviolet cured resins of silicone base, urethane base, acrylic, and epoxy base. The treatment can be carried out in a known method. Anti-sticking treatment is carried out for prevention of sticking with adjacent layers. Antireflection treatment may be applied to prevent reflection of external light on the surface of the polarizing plate, and carried out by forming such an anti-reflection film or the like in a known method.

A purpose of anti-glare treatment is to prevent reflection of external light on the polarizing plate surface from hindering visibility of light transmitted through the polarizing plate. The anti-glare treatment can be carried out by providing microscopic asperity on a surface of a transparent protective film in an appropriate manner, e.g., by roughening the surface by sand-blasting or embossing, or by forming the transparent protective layer by blending transparent particles in the above-described transparent resin.

The above-described transparent fine particles will be selected from silica, alumina, titania, zirconia, stannic oxide, indium oxide, cadmium oxide, antimony oxide or the like. Inorganic fine particles having electroconductivity can be used as well. Alternatively, the particles can be organic fine particles comprising, for example, crosslinked or uncrosslinked polymer particles. The average diameter of the transparent particles is, for example, from 0.5 µm to 20 µm, through there is no specific limitation. An amount of the transparent fine particles is from 2 weight parts to 70 weight parts, and generally, from 5 weight parts to 50 weight parts, for 100 weight parts of a transparent resin, though there is no specific limitation.

An anti-glare layer comprising transparent fine particles can be provided as the transparent protective layer or a coating layer applied onto the transparent protective layer surface. The anti-glare layer can function as a diffusion layer to diffuse light transmitted through the polarizing plate in order to enlarge visual angles (i.e., visually-compensating function).

The above-mentioned layers such as the antireflection layer, an anti-sticking layer, the diffusion layer and the anti-glare layer can be laminated on the polarizing plate, as an sheet of optical layers comprising these layers, separately from the transparent protective layer.

The above-described polarizer can be bonded to the transparent protective layer in a known method without any specific limitations. In general, adhesives (including pressure-sensitive adhesives) can be used as described above, and the adhesive can be selected appropriately, e.g., depending on the kinds of the polarizers and the transparent protective layer. The adhesive can be selected from polymeric adhesives based on acrylic substances, vinyl alcohol, silicone, polyester, polyurethane, polyether or the like, and rubber-based adhesives. Alternatively, the adhesive can contain a water-soluble crosslinking agents of vinyl alcohol-based polymers, such as boric acid, borax, glutaraldehyde, melamine, and oxalic acid. These adhesives are difficult to peel off even under an influence of humidity or heat, and they are excellent in optical transparency and polarization degree. Specifically, a PVA-based adhesive is preferably used for a polarizer of a PVA-based film in view of its adhesion stability. Such an adhesive can be applied directly onto the surface of a polarizer or a transparent protective layer. Alternatively, a layer of the adhesive formed as a tape or a sheet can be arranged on the surface. When an additive is prepared as an aqueous solution, other additive(s) or catalyst(s) such as acid(s) can be blended as required. In coating the adhesive, an additive or a catalyst such as an acid can be blended into the aqueous solution of the adhesive. Though the thickness of the adhesive layer is not limited specifically, for example, it ranges from 1 nm to 500 nm, preferably from 10 nm to 300 nm, and more preferably from 20 nm to 100 nm.

The polarizing plate according to the present invention can be formed as an optical member including one or several additional optical layers or the like in use. Though there is no specific limitation on the optical layer, the examples include optical layers used for forming liquid crystal displays or the like, i.e., a reflector, a transflector, a retardation plate such as a wavelength ($\lambda$) plate like a half wavelength plate and a quarter wavelength plate, a viewing-angle compensating film, and a brightness-enhancement film. These optical layers can be used alone or can be combined with any other kinds of layers. The optical layer can be a monolayer or a laminate of plural layers. Particularly preferable optical members include reflective polarizing plate, a semitransparent reflective polarizing plate, an elliptically polarizing plate, a circularly polarizing plate, a polarizing plate having a viewing-angle compensating film laminated thereon, and a polarizing plate on which a brightness enhancement film is laminated.

The respective polarizing plates will be described below.

First, an example of the reflective polarizing plate or the semitransparent reflective polarizing plate according to the present invention will be described. The reflector is provided to a polarizing plate having the elastic modulus in order to form a reflective polarizing plate, and the transflector is provided to a polarizing plate having the elastic modulus in order to form a semitransparent reflective polarizing plate.

In general, such a reflective polarizing plate is arranged on a backside of a liquid crystal cell in order to make a liquid crystal display to reflect incident light from a visible side (display side). The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of the polarizing plate having the elastic modulus. For example, a transparent protective film of the polarizing plate is prepared by matting one surface (exposed surface) if required. On this surface, a foil comprising a reflective metal such as aluminum or a deposition film is applied to form a reflective polarizing plate.

An additional example of a reflective polarizing plate comprises the above-mentioned transparent protective film having a surface of a microscopic asperity due to contained fine particles, and also a reflector corresponding to the microscopic asperity. The reflector having a microscopic asperity surface diffuses incident light by irregular reflection so that directivity and glare can be prevented and irregularity in color tones can be controlled. This reflector can be formed by disposing a metal foil or a metal deposition film directly on a microscopic asperity surface of the transparent protective layer in any appropriate methods including deposition such as vacuum deposition, and plating such as ion plating and sputtering.

Alternatively, the reflector can be used as a reflecting sheet formed by providing a reflecting layer onto a proper film similar to the transparent protective film. Since a typical reflecting layer of a reflector is made of a metal, it is preferable in use of the reflector that the reflecting surface of the reflecting layer is coated with a film, a polarizing plate or the like in order to prevent the reflection rate from reduction due to oxidation. As a result, the initial reflection rate is maintained for a long period, and a separate protective layer can be omitted.

A semitransparent polarizing plate is provided by replacing the reflector in the above-mentioned reflective polarizing plate by a transflector, and it is exemplified by a half mirror that reflects and transmits light at the reflecting layer.

In general, such a semitransparent polarizing plate is arranged on a backside of a liquid crystal cell. In a liquid crystal display comprising the semitransparent polarizing plate, incident light from the visible side (display side) is reflected to display an image when the liquid crystal display is used in a relatively bright atmosphere, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following explanation is about an elliptically polarizing plate or a circularly polarizing plate formed by laminating a retardation plate or k plate on a polarizing plate having the elastic modulus.

The above-described elliptically polarizing plate is effective in compensating (preventing) colors (for example, blue or yellow) generated due to birefringence in a liquid crystal layer of a super twist nematic (STN) liquid crystal display so as to provide a black-and-white display free of such colors. An elliptically polarizing plate with controlled three-dimensional refractive index is preferred further since it can compensate (prevent) colors that will be observed when looking a screen of the liquid crystal display from an oblique direction. The circularly polarizing plate is effective in adjusting color tones of an image of a reflective liquid crystal display that has a color image display, and the polarizing plate serves to prevent reflection as well.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate ($\lambda$/4 plate) is used for modifying linearly polarized light to either elliptically polarized light or circularly polarized light, and for modifying either elliptically polarized light or circularly polarized light to linearly polarized light. A half wavelength plate ($\lambda$/2 plate) is used in general for modifying a polarization direction of linearly polarized light.

Examples of the retardation plates include birefringent films, oriented films of liquid crystal polymers, and laminates of oriented layers of liquid crystal polymers supported by the films. The birefringent films can be prepared by stretching films of any suitable liquid crystal polymers such as polycarbonate, PVA, polystyrene, polymethyl methacrylate, polyolefins including polypropylene, polyalylate, polyamide, and polynorbornene.

The retardation plate can have a phase difference suitable for intended uses such as compensation of a visual angle (e.g., widening of visual angle) and compensation of coloring caused by birefringence of the liquid crystal layer, or plates having varied wavelengths such as a half wavelength plate and a quarter wavelength plate. Alternatively, the retardation plate can be an incline-oriented film having a refractive index controlled in the thickness direction. Two or more kinds of retardation plates can be laminated for forming a laminate with controlled optical characteristics such as the phase difference.

The incline-oriented film is produced, for example, by bonding a heat shrinkable film onto a polymer film and stretching and/or shrinking the polymer film under an influence of a shrinking force provided by the heat, or by orienting obliquely a liquid crystal polymer.

The polarizing plate described below comprises an additional viewing-angle compensating film laminated on the polarizing plate having the elastic modulus.

The viewing-angle compensating film is used for widening a visual angle so that an image can be clear relatively when a screen of a liquid crystal display is seen not in a direction perpendicular to the screen but in a slightly oblique direction. Such a viewing-angle compensating film can be a triacetylcellulose film coated with a discotic liquid crystal, or a retardation plate. While an ordinary retardation plate is a birefringent polymer film that is stretched uniaxially in the face direction, a retardation plate used for an viewing-angle compensating film is a two-way stretched film such as a birefringent polymer film stretched biaxially in the face direction and an incline-oriented polymer film with controlled birefringence in the thickness direction that is stretched uniaxially in the face direction and stretched also in the thickness direction. The incline-oriented film is prepared by, for example, bonding a heat shrinkable film to a polymer film and stretching and/or shrinking the polymer film under an influence of a shrinkage force provided by heat, or by orienting obliquely a liquid crystal polymer. A polymer as a material of the retardation plate is similar to the polymer used for the above-mentioned retardation plate.

A polarizing plate described below includes further a brightness enhancement film laminated on the polarizing plate having the elastic modulus.

Generally, this polarizing plate is arranged on a backside of a liquid crystal cell. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. It allows entrance of light from a light source such as a backlight so as to obtain transmitted light in a predetermined polarization state, while reflecting light other than light in the predetermined polarization state. Light that is reflected at this brightness enhancement film is reversed through a reflector or the like arranged additionally behind the brightness enhancement film. The reversed light that re-enters the brightness enhancement film is transmitted partly or entirely as light in a predetermined polarization state, so that light transmitting the brightness enhancement film is increased and polarized light that is hardly absorbed in the polarizing film (polarizer) is supplied. As a result, quantity of light available for the liquid crystal display etc. can be increased to enhance brightness. When light enters through a polarizer from the backside of a liquid crystal cell by using a backlight or the like without using any brightness enhancement films, most light is absorbed in the polarizer but not transmitted by the polarizer if the light has a polarization direction inconsistent with the polarization axis of the polarizer. Depending on characteristics of the polarizer, about 50% of light is absorbed in the polarizer, and this decreases quantity of light available in the liquid crystal display or the like and makes the image dark. The brightness enhancement film repeatedly prevents light having a polarization direction to be absorbed in the polarizer from entering the polarizer, and reflects the light on the brightness enhancement film, reverses the light through a reflecting layer or the like arranged behind, and makes the light re-enter the brightness enhancement plate. Since the polarized light that is reflected and reversed between them is transmitted only if the light has a polarization direction to pass the polarizer, light from a backlight or the like can be used efficiently for displaying images of a liquid crystal display in order to provide a bright screen.

A diffusion plate can also be provided between the brightness enhancement film and a reflective layer such as the above-described reflector. Polarized light reflected by the brightness enhancement film is directed to the reflector. The diffusion plate diffuses the passing light uniformly and at the same time, it cancels the polarization so as to provide a depolarized state. Namely, the diffusion plate converts the light back into its original state as natural light. This depolarized light, i.e., natural light is directed to the reflector, reflected at the reflector, and it passes again the diffusion plate so as to re-enter the brightness enhancement film. The state of natural light is recovered by repeating this series of actions. Thereby, the diffusion plate serves to maintain brightness of the display screen and decrease irregularity in the brightness. That is, a display screen having uniform brightness can be obtained by providing a diffusion plate for recovering natural light, since the diffusion plate has a diffusion function and further it can increase appropriately the repeated reflection of the initial incident light.

Though there is no specific limitation, the brightness enhancement film is advantageously selected from a multilayer thin film of a dielectric or a multilayer lamination of thin films with varied refraction aeolotropy that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate that reflects either clockwise or counterclockwise circularly polarized light while transmitting other light.

Therefore, for a brightness enhancement film to transmit linearly polarized light having a predetermined polarization axis, the transmission light enters the polarizing plate by matching the polarization axis so that absorption loss due to the polarizing plate is controlled and the light can be transmitted efficiently. For a brightness enhancement film to transmit circularly polarized light, i.e., a cholesteric liquid crystal layer, preferably, the transmission circularly polarized light is converted to linearly polarized light before entering the polarizing plate in an aspect of controlling of the absorption loss, though the circularly polarized light can enter the polarizer directly. Circularly polarized light can be converted to linearly polarized light and vice versa by using a quarter wavelength plate for a retardation plate.

A retardation plate having a function as a quarter wavelength plate in a wide wave range including a visible light region can be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness enhancement film can comprise a single layer or at least two layers of retardation layers. A cholesteric liquid crystal layer also can be provided by combining layers different in the reflection wavelength and it can be configured by overlapping two or at least three layers. As a result, the obtained retardation plate can reflect circularly polarized light in a wide wavelength range including a visible light region, and this can provide transmission circularly polarized light in a wide wavelength range.

A polarizing plate according to the present invention can be an optical member made by laminating the polarizing plate having the above-described elastic modulus and two or at least three optical layers. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate.

An optical member comprising a laminate of at least two optical layers can be formed in a method of laminating layers separately in a certain order for manufacturing a liquid crystal display etc. Since an optical member that has been laminated previously has excellent stability in quality and assembling operability, efficiency in manufacturing a liquid crystal display can be improved. Any appropriate adhesion means such as a pressure-sensitive adhesive layer can be used for laminating the polarizing plate and optical layers.

It is preferable that a polarizing plate according to the present invention has an adhesive layer (or a pressure-sensitive adhesive layer) for facilitating lamination onto a liquid crystal cell or the like. Such an adhesive layer can be arranged on one or both surfaces of the polarizing plate. The pressure-sensitive adhesive layer can contain any suitable materials such as an acrylic polymer in accordance with conventional techniques, without any specific limitations. Particularly, a pressure-sensitive adhesive layer having a low moisture absorption coefficient and an excellent heat resistance are preferred from an aspect of prevention of foaming or peeling caused by moisture absorption or prevention of degradation in the optical properties and warping of a liquid crystal cell caused by difference in thermal expansion coefficients. As a result, a high quality liquid crystal display having an excellent durability can be produced. The adhesive layer can show light diffusion by containing fine particles. For the purpose, a solution or melt of an adhesive is applied directly on a predetermined surface of the polarizing plate by a development method such as flow-expansion and coating. Alternatively, an adhesive layer is formed on a separator in the same manner and transferred to a predetermined surface of the polarizing plate. Such a layer can be formed on any surface of the polarizing plate. For example, it can be formed on an exposed surface of the optically compensating retardation plate of the polarizing plate.

When a surface of an adhesive layer on a surface of the polarizing plate is exposed, preferably, the adhesive layer is covered with a separator by the time the adhesive layer is used so that contamination will be prevented. The separator can be made of an appropriate thin sheet such as a transparent protective film by coating a peeling agent if required, and the peeling agent may be selected, for example, from a silicone-based agent, a long-chain alkyl-based agent, a fluorine-based agent, an agent comprising molybdenum sulfide or the like.

The adhesive layer can be a monolayer or a laminate. The laminate can include monolayers different from each other in the type or in the compositions. When arranged on both surfaces of the polarizing plate, the adhesive layers can be same or can be varied.

The thickness of the adhesive layer can be determined appropriately depending on the constituents or the like of the polarizing plate. In general, it is from 1 µm to 500 µm.

It is preferable that the adhesive layer is made of an adhesive having excellent optical transparency and appropriate characteristics such as wettability, cohesiveness, and adhesiveness. The adhesive can be prepared appropriately based on polymers such as an acrylic polymer, a silicone-based polymer, polyester, polyurethane, polyether, and synthetic rubber.

Adhesiveness of the adhesive layer can be controlled appropriately in a known method. For example, the degree of cross-linkage and the molecular weight will be adjusted on the basis of a composition or molecular weight of the base polymer, crosslinking method, a content of the crosslinking functional group, and an amount of the blended crosslinking agent.

The above-described members composing the polarizing plate and the optical member, such as a polarizing film, a transparent protective film, an adhesive layer, can have ultraviolet absorption power as a result of treatment with an ultraviolet absorber such as an ester salicylate compound, a benzophenone compound, a benzotriazole compound, a cyanoacrylate compound, and a nickel complex salt compound.

Polarizing films according to the present invention can be used preferably for forming various devices such as liquid crystal displays. For example, a polarizing plate is arranged on at least one surface of a liquid crystal cell in order to form a liquid crystal panel used in a liquid crystal display of, e.g., a transmission type, a reflection type, or a transmission-reflection type. A liquid crystal cell to compose the liquid crystal display can be selected from appropriate cells of such as active matrix driving type represented by a thin film transistor, a simple matrix driving type represented by a twist nematic type and a super twist nematic type.

A typical liquid crystal cell is composed of opposing liquid crystal cell substrates and a liquid crystal injected into a space between the substrates. The liquid crystal cell substrates can be made of glass, plastics or the like without any specific limitations. Materials for the plastic substrates can be selected from conventionally known materials without any specific limitations.

When polarizing plates or optical members are arranged on both surfaces of a liquid crystal cell, the polarizing plates or the optical members on the surfaces can be the same or can be varied. Moreover, for forming a liquid crystal display, one or at least two layers of appropriate members such as a prism array sheet, a lens array sheet, an optical diffuser and a backlight can be arranged at proper positions.

The liquid crystal display according to the present invention is not limited specifically as long as it includes a liquid crystal panel and the liquid crystal panel is of the present invention. Furthermore, it can include a light source.

Though there is no specific limitation about the light source, in a preferred example it is a flat light source emitting polarized light so as to use light energy effectively.

For the liquid crystal display according to the present invention, it is also possible to further dispose a diffusion plate, an anti-glare layer, an anti-reflection film, a protective layer/plate, on an optical film (polarizing plate) at the viewing side. Alternatively, a retardation plate for compensation or the like can be disposed appropriately between a liquid crystal cell and a polarizing plate in the liquid crystal panel.

Application of the polarizing film of the present invention is not limited to the above-described liquid crystal display, but the polarizing film can be used also for other image displays such as a plasma display or an electroluminescence (EL) display. The following description is about an EL display having a polarizing film of the present invention.

The EL display includes a polarizing plate according to the present invention. This EL display can be an organic EL display or an inorganic EL display.

Recently, for EL displays, use of an optical film such as a polarizer or a polarizing plate together with a λ/4 plate is suggested for preventing reflection from an electrode in a black state. The polarizing film of the present invention is useful particularly when any of linearly polarized light, circularly polarized light or elliptically polarized light is emitted from the EL layer, or when obliquely emitted light is polarized partially even if natural light is emitted in the front direction.

The following description is about a typical organic EL display. In general, an organic EL display has a luminant (organic EL luminant) that is prepared by laminating a transparent electrode, an organic luminant layer and a metal electrode in a certain order on a transparent substrate. Here, the organic luminant layer is a laminated body of various organic thin films. Known examples thereof include a laminate of a hole injection layer made of triphenylamine or the like and a luminant layer made of a phosphorous organic solid such as anthracene; a laminate of the luminant layer and an electron injection layer made of perylene derivative or the like; or a laminate of the hole injection layer, the luminant layer and the electron injection layer.

In general, the organic EL display emits light on the principle of a system of applying a voltage to the transparent electrode and the metal electrode so as to inject holes and electrons into the organic luminant layer, energy generated by the re-bonding of these holes and electrons excites the phosphor, and the excited phosphor emits light when it returns to the basis state. The re-bonding mechanism of the holes and electrons is similar to that of an ordinary diode. Current and the light emitting intensity exhibit a considerable nonlinearity accompanied with a rectification with respect to the applied voltage.

It is preferred for the organic EL display that at least one of the electrodes is transparent so as to obtain luminescence at the organic ruminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag, and A-Li may be used.

In an organic EL display configured as described above, it is preferable that the organic ruminant layer is made of a film that is extremely thin such as about 10 nm. Therefore, the organic ruminant layer can transmit substantially whole light as the transparent electrode does. As a result, when the layer does not illuminate, a light beam entering from the surface of the transparent substrate and passing through the transparent electrode and the organic ruminant layer before being reflected at the metal layer comes out again to the surface of the transparent substrate. Thereby, the display surface of the organic EL display looks like a mirror when viewed from exterior.

The organic EL display according to the present invention includes, for example, the organic EL ruminant formed by providing a transparent electrode on the surface of the organic ruminant layer and a metal electrode on the backside of the organic ruminant layer, and preferably, a polarizing film (e.g., polarizer) according to the present invention is arranged on the surface of the transparent electrode. More preferably, a λ/4 plate is arranged between the polarizing plate and an EL device. By arranging the polarizing film of the present invention, the organic EL display has an effect of suppressing external reflection and improving visibility. It is also preferable that an additional retardation plate is arranged between the transparent electrode and the polarizing film.

The retardation plate and the polarizing film (e.g., a polarizer and a polarization plate) function to polarize light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization direction of the retardation plate and the polarizing plate to be π/4. That is, the polarizing plate transmits only the linearly polarized light constituent among the external light entering the organic EL display. In general, the linearly polarized light is changed into elliptically polarized light by the retardation plate. When the retardation plate is a quarter wavelength plate and when the angle of the polarization direction provided by the polarizing plate and the retardation plate is π/4, the light is changed into circularly polarized light.

Generally, this circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

EXAMPLES

The present invention will be described below more specifically by referring to illustrative Examples, though the present invention is not restricted thereto. The following description includes a method of measuring elastic modulus and a method of measuring transmittance.

(Measurement of Elastic Modulus)

A specimen of 50 mm (MD direction)×5 mm (TD direction) was sectioned from a polarizing plate. This specimen was set in a tensile tester (trade name: Autograph AG-1, produced by Shimadsu Corp.) for a measurement of its elastic modulus under a condition of a room temperature, load cell 500 N, and an elastic stress rate of 5 mm/min. The method of measurement corresponds to the tensile test method described in Japanese Industrial Standard (JIS) K 7127 except that the dimension of the polarizing plate sample is determined as mentioned above.

(Transmittance)

Transmittance denotes a Y value that is measured by means of a spectral transmittance meter (DOT-3C produced by Murakami Color Research Laboratory), where the visibility is corrected in view of two-degrees-visual field (C light source) according to JIS Z 8701.

(Polarization Degree)

A polarizing degree is obtained by calculating a measurement result of transmittance ($H_0$ and $H_{90}$) in accordance with the method for measuring transmittance, and by using the following equation. $H_0$ denotes a transmittance obtained by laminating two polarizing films so that the polarizing axes become parallel, while $H_{90}$ denotes a transmittance obtained by laminating two polarizing films so that the polarizing axes become perpendicular to each other. The parallel transmittance ($H_0$) and the perpendicular transmittance ($H_{90}$) are Y values corrected in the visibility according to JIS Z 8701.

$$\text{Polarization Degree } (\%) = \sqrt{\frac{H_0 - H_{90}}{H_0 + H_{90}}} \times 100$$

Example 1

A PVA film having a thickness of 45 μm (polarization degree: 2400; saponification degree: 99.9%) was swollen in pure water. Then, the film was impregnated to dye in an aqueous solution containing a mixture of 1 wt % iodine and 3 wt % potassium iodide. Next, the film was impregnated in an aqueous solution of 4.5 wt % boric acid, stretched in the solution to 5.3 times its original length in the longitudinal direction, and subsequently impregnated in an aqueous solution of 5 wt % borax for further stretching, and thus, the total stretch ratio in the longitudinal direction was 5.5. After the stretching, moisture on the film surface was removed, and the film was dried at 50° C. This stretched film, having a thickness of 18 μm, was used for a polarizer. TAC films having a thickness of 80 μm were bonded to the both surfaces of the polarizer through an adhesive based on a water soluble PVA, and the film was further dried at 70° C. for 6 minutes to form a polarizing plate.

The thus obtained polarizing plate had an elastic modulus of 3370 N/mm². The optical transmittance was 43.3%, and the polarization degree was 99.98%.

Example 2

A PVA film having a thickness of 30 μm (polarization degree: 2400; saponification degree: 99.9%) was dyed similarly to Example 1. A polarizer (11 μm in thickness) was obtained from the PVA film similarly to Example 1 except that the stretch ratio in the aqueous solution of boric acid was 5.7 and the total stretch ratio after the stretching in the aqueous solution of borax was 6.0. An unstretched PET film 75 μm in thickness was bonded to the both surfaces of the polarizer through the adhesive, and the polarizer was dried at 65° C. for 6 minutes to form a polarizing plate.

The thus obtained polarizing plate had an elastic modulus of 2740 N/mm². The transmittance was 43.3%, and the polarization degree was 99.95%.

Example 3

A PVA film having a thickness of 40 μm (polarization degree: 2400; saponification degree: 99.9%) was dry-stretched in the longitudinal direction 5 times its original length, dyed similarly to Example 1, and impregnated in the aqueous solution of boric acid so as to be stretched 1.2 times further in the longitudinal direction. After removal of moisture on the surface, the film was dried at 50° C. to form a polarizer (8 μm in thickness). The polarizer was rolled onto a core, and then bonded to polyolefin-based transparent films (50 μm in thickness) on both surfaces through the adhesive while being dried at 40° C., thereby forming a polarizing plate.

The transparent film was prepared in the following manner. First, a solution having a solid content of 15 wt % was prepared by dissolving in methylene chloride 75 weight parts of an alternating copolymer of isobutene and N-methyl maleimide (a content of N-methyl maleimide was 50 mol %) and 25 weight parts of acrylonitrile-styrene copolymer (a content of acrylonitrile was 28 wt %). This solution was flow-expanded on a PET film arranged on a horizontal glass sheet, and left to dry at a room temperature for 60 minutes so as to form a film on the PET film. Subsequently, the thus formed film was peeled off from the PET film, dried at 100° C. for 10 minutes. Then, the film was further dried at 140° C. for 10 minutes, and at 160° C. for 30 minutes so as to form a transparent film.

The thus obtained polarizing plate had an elastic modulus of 2250 N/mm$^2$. The optical transmittance was 43.6%, and the polarization degree was 99.91%.

Comparative Example 1

A PVA film having a thickness of 75 μm (polarization degree: 2400; saponification degree 99.9%) was dyed similarly to Example 1. The subsequent steps for forming a polarizer (27 μm in thickness) were also similar to those of Example 1 except that the stretch ratio in the aqueous solution of boric acid was 5.7 but the film was not stretched in the aqueous solution of borax. The polarizer was formed into a polarizing plate by bonding on both the surfaces TAC films (80 μm in thickness) through the adhesive and further dried at 60° C. for 6 minutes.

The thus obtained polarizing plate had an elastic modulus of 3270 N/mm$^2$. The optical transmittance was 43.6%, and the polarization degree was 99.96%.

The thus obtained polarizing plates were subjected to heating and humidifying respectively as described below before evaluations of durability.

(Occurrence of Warping)

Each of the polarizing plates was sectioned to be 234 mm×310 mm to have an absorption axis angle of 45. The plate was bonded to a glass sheet 0.7 mm in thickness (250 mm×350 mm) through an acrylic adhesive so as to produce a laminate to be evaluated. After heating the laminate at 80° C. for 24 hours, it was lain on a smooth and horizontal measurement table in order to measure the warping amount (mm) of the laminate at the four corners with respect to the measurement table, i.e., how much the four corners were distanced from the measurement table (spatial distance). A separate laminate was humidified at 60° C./90% RH for 24 hours, and subjected to a similar measurement of the warping amount. A maximum value among the warping amounts at the four corners was adopted as its maximum warping amount (mm).

(Variation in Transmittance)

Transmittance of the laminate was measured before and after heating or humidifying treatment. Amount of variation in transmittance ($T_a$-$T_b$) was calculated as a value obtained by subtracting transmittance ($T_b$) before the treatment from transmittance ($T_a$) after the treatment.

(Variation in Polarization Degree)

A polarization degree was calculated for each of the laminates before and after the heating or humidifying treatment, and a variation in polarization degree ($P_a$-$P_b$) was obtained by subtracting a polarization degree ($P_b$) before the treatment from a polarization degree ($P_a$) after the treatment.

The polarizing degree was obtained by calculating a measurement result of transmittance ($H_0$ and $H_{90}$) in accordance with the method for measuring transmittance, and by using the above-described equation. $H_0$ denotes a transmittance obtained by laminating two polarizing films so that the polarizing axes become parallel, while $H_{90}$ denotes a transmittance obtained by laminating two polarizing films so that the polarizing axes become perpendicular to each other. The parallel transmittance ($H_0$) and the perpendicular transmittance ($H_{90}$) are Y values corrected as described above.

(Variation in Hue)

A hue value b (NBS) for each of the laminates was obtained before and after the heating or humidifying treatment, and a variation in hue was calculated by subtracting 'a hue value b before the treatment' from 'a the value b after the treatment'. The hue value b can be measured using an integrating sphere type spectral transmittance meter (DOT-3C produced by Murakami Color Research Laboratory).

(Evaluation of Ambient Unevenness)

Ambient unevenness of an in-plane panel was evaluated by using a polarizing plate after the heating or humidifying treatment. First, each of the polarizing plates was sectioned to be 320 mm×235 mm to have an absorption axis angle of 45°. This was bonded to a glass sheet 0.7 mm in thickness (350 mm×250 mm) through an acrylic adhesive, thereby providing a laminate. The laminate was subjected to heating or humidifying treatment under a condition as described above. Then, a backlight was disposed on one surface of the laminate facing the glass sheet, and the brightness was measured from the laminate facing the polarizing plate by using a luminance meter (trade name: BM-5A produced by Tbpcon). Specifically, the brightness was measured at nine points in total (measurement points (1)–(9)) in the plane of the polarizing plate of the laminate (see FIG. 1). In FIG. 1, a measurement point (5) is at an in-plane center of the polarizing plate 1, and each of the remaining measurement points are positioned distanced by 5 mm from the periphery of the polarizing plate. Measurement points (2) and (8) are positioned at centers in the cross direction, while measurement points (4) and (6) are positioned at centers in the longitudinal direction. Similarly, brightness of the backlight alone was measured at the nine points without the laminate arranged.

Brightness at the respective measurement points was substituted in the following equation so as to calculate transmittance (T1–T9) at the respective measurement points. In the equation, 'A' denotes brightness of beam emitted from the backlight passing through the laminate, while 'B' denotes brightness for the corresponding points where the backlight was used alone.

$$\text{Transmittance (\%)} = A(\text{cd/m}^2)/B(\text{cd/m}^2)$$

Based on the transmittance values (T1–T9) obtained for the respective points, an ambient unevenness value (%) was calculated using the following equation. As the ambient unevenness value is relatively low, variation of the in-plane transmittance was suppressed, which can be evaluated as being excellent from an optical viewpoint.

$$\text{Ambient unevenness value (\%)} = [(T2+T4+T6+T8)/4] - [(T1+T3+T5+T7+T9)/5]$$

For controls, similar laminates were prepared in each of Examples and Comparative Example 1 except that the heating or humidifying treatment was not carried out, and the ambient unevenness values were calculated in the same manner.

The following Table 1 shows results for durability provided by heating, and Table 2 shows results for durability provided by humidifying.

TABLE 1

HEATING

| | Elastic modulus (N/mm$^2$) | Maximum warping amount (mm) | Ambient unevenness value (%) | Variation in transmittance (%) | Variation in polarization degree (%) | Variation in hue (NBS) |
|---|---|---|---|---|---|---|
| Example 1 | 3370 | 4.37 | 0.0053 | 0.33 | −0.28 | 1.18 |
| Example 2 | 2740 | 2.74 | 0.0020 | 0.24 | −0.20 | 1.09 |
| Example 3 | 2250 | 2.48 | 0.0015 | 0.17 | −0.10 | 1.15 |
| Com. Ex. 1 | 3720 | 5.94 | 0.0090 | 0.30 | −0.22 | 1.24 |

TABLE 2

HUMIDIFYING

| | Elastic modulus (N/mm$^2$) | Maximum warping amount (mm) | Ambient unevenness value (%) | Variation in transmittance (%) | Variation in polarization degree (%) | Variation in hue (NBS) |
|---|---|---|---|---|---|---|
| Example 1 | 3370 | 1.77 | 0.0080 | 0.87 | −0.32 | 0.95 |
| Example 2 | 2740 | 1.05 | 0.0035 | 0.63 | −0.06 | 1.03 |
| Example 3 | 2250 | 0.85 | 0.0010 | 0.48 | −0.13 | 1.14 |
| Com. Ex. 1 | 3720 | 2.38 | 0.0200 | 0.93 | −0.31 | 1.01 |

As illustrated in Tables 1 and 2, since a polarizing plate of each of the Examples has an elastic modulus of about 3500 N/mm$^2$ or less unlike the Comparative Example 1, the warping amount of the laminate can be decreased sufficiently. This result indicates that since a polarizing plate of the Example satisfying the condition of the elastic modulus serves to decrease a force exerted at the time of dimensional change under influences of heating or humidifying, occurrence of warping in a laminate of the polarizing plate and a glass sheet due to the force exerted at the time of the size variation can be suppressed. The variation in transmittance, variation in polarization degree and variation in hue for the polarizing plates of the Examples were in ranges satisfactory in use. Furthermore, it is demonstrated from a comparison between the Examples and Comparative Example 1 in Tables 1 and 2 that ambient unevenness can be suppressed considerably in Examples by either heating or humidifying treatment. While the ambient unevenness was less than 0.0200 both for the control of Examples and the control of Comparative Example 1, the ambient unevenness can be suppressed sufficiently according to the Examples. As indicated in the Examples, in-plane unevenness (distortion) can be suppressed as well because of occurrence of warping. Therefore, according to the present invention, problems for conventional polarizing films caused by variation in the optical properties can be solved, thus enabling formation of image displays such as liquid crystal displays with excellent display performance.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A polarizing film which transmits a light having a first polarization and does not transmit light having a second polarization, the polarizing film having an elastic modulus of at most about 3500 N/mm$^2$, wherein the polarizing film comprises a polarizer, wherein the polarizer is a stretched film having a thickness of at most 20 μm, and a transparent protective layer laminated on at least one surface of the polarizer.

2. The polarizing film according to claim 1, wherein a dichroic material is adsorbed in the stretched film.

3. The polarizing film according to claim 1, wherein the stretched film is a polarizer.

4. The polarizing film according to claim 1, having a transmittance of at least 43%.

5. The polarizing film according to claim 1, having a polarization degree of at least 98%.

6. The polarizing film according to claim 1, wherein the stretched film is a polyvinyl alcohol-based film.

7. The polarizing film according to claim 1, wherein the stretched film is prepared by stretching an unstretched film having a thickness of at most 50 μm.

8. The polarizing film according to claim 7, wherein the stretched film has a stretch ratio in the stretching direction ranging 3.0–7.0 with respect to the unstretched film.

9. The polarizing film according to claim 7, wherein the stretched film has a stretch ratio in the stretching direction ranging 5.5–6.0 with respect to the unstretched film.

10. The polarizing film according to claim 1, wherein the transparent protective layer is a polymer film.

11. The polarizing film according to claim 1, further comprising at least one of a reflector and a transflecter.

12. The polarizing film according to claim 1, further comprising a retardation film.

13. The polarizing film according to claim 1, further comprising a viewing-angle compensating film.

14. The polarizing film according to claim 1, further comprising a brightness enhancement film.

15. The polarizing film according to claim 1, having an elastic modulus of at most about 2800 N/mm$^2$.

16. The polarizing film according to claim 1, having an elastic modulus of at most about 2300 N/mm$^2$.

17. The polarizing film according to claim 1, having an elastic modulus of at most about 2000 N/mm$^2$.

18. A liquid crystal panel comprising a liquid crystal cell and the polarizing film of claim 1 arranged on at least one surface of the liquid crystal cell.

19. The liquid crystal panel according to claim 18, wherein the liquid crystal cell comprises a liquid crystal cell substrate and a liquid crystal, the liquid crystal cell substrate being at least one of a glass substrate and a plastic substrate.

20. An image display comprising an image display panel and the polarizing film according to claim 18.

21. The liquid crystal display according to claim 20, further comprising a light source.

22. An image display comprising an image display panel and the polarizing film according to claim 1.

23. An image display according to claim 22, wherein the image display is selected from the group consisting of a liquid crystal display, a plasma display and an electroluminescence display.

24. A method of making a polarizing film, comprising stretching a polymer film so that an elastic modulus of the polarizing film is at most about 2800 N/mm$^2$, wherein the unstretched film has a thickness of at most about 50 μm.

25. The method according to claim 24, wherein the stretched film has a stretch ratio in the stretching direction ranging 3.0–7.0 with respect to the unstretched film.

26. The method according to claim 24, wherein the unstretched film is stretched in a solution containing boric acid and a solution containing borax.

27. The polarizing film according to claim 24, wherein the stretched film has a stretch ratio in the stretching direction ranging 5.5–6.0 with respect to the unstretched film.

28. A polarizing film which transmits a light having a first polarization and does not transmit light having a second polarization, the polarizing film having an elastic modulus of at most about 3500 N/mm$^2$, and a transmittance of at least 43%.

29. A polarizing film which transmits a light having a first polarization and does not transmit light having a second polarization, the polarizing film having an elastic modulus of at most about 3500 N/mm$^2$, and a polarization degree of at least 98%.

30. A polarizing film which transmits a light having a first polarization and does not transmit light having a second polarization, the polarizing film having an elastic modulus of at most about 3500 N/mm$^2$, wherein the polarizing film comprises a stretched film, and the stretched film is prepared by stretching an unstretched film having a thickness of at most 50 μm.

31. The polarizing film according to claim 30, wherein the stretched film has a stretch ratio in the stretching direction ranging 3.0–7.0 with respect to the unstretched film.

32. The polarizing film according to claim 30, wherein the stretched film has a stretch ratio in the stretching direction ranging 5.5–6.0 with respect to the unstretched film.

* * * * *

UNITED STATES PATENT AND TRADEMARK OFFICE
CERTIFICATE OF CORRECTION

PATENT NO. : 7,110,177 B2  
APPLICATION NO. : 10/347286  
DATED : September 19, 2006  
INVENTOR(S) : Youichirou Sugino et al.

It is certified that error appears in the above-identified patent and that said Letters Patent is hereby corrected as shown below:

On Title Page,  
Item (56) References Cited:  
The following references cited information is inserted in U.S. PATENT DOCUMENTS

| | | | |
|---|---|---|---|
| 4,388,375 | 6/1983 | Hopper | ............ 728/723.7 |
| 5,425,990 * | 6/1995 | Blum et al. | ............ 428/337 |
| 5,914,073 | 6/1999 | Kobayashi et al. | ............ 252/565 |
| 6,051,289 | 4/2000 | Tsujimoto et al. | ............ 728/1.31 |
| 6,064,457 | 5/2000 | Aminaka | ............ 379/117 |
| 6,361,838 B1 | 3/2002 | Miyatake et al. | ............ 728/1.31 |
| 2003/0072078 A1 | 4/2003 | Higashio et al. | ............ 359/785 |

On Title Page, Item (56)  
The following references cited information is inserted in FOREIGN PATENT DOCUMENTS

| | | |
|---|---|---|
| JP | 10-111411 | 4/1998 |
| JP | 05-212828 | 8/1993 |
| JP | 10-130402 | 5/1998 |
| JP | 2000-266932 | 9/2000 |
| JP | 2000-321432 | 11/2000 |

On Title Page,  
Item (57) ABSTRACT:  
The word "tilin" is corrected to --film-- at line 6.

Col. 23, lines 8-9  
Claim 20:  
Claim 20 is changed as follows:

--A liquid cyrstal display comprising the liquid crystal panel of claim 18--.

UNITED STATES PATENT AND TRADEMARK OFFICE
CERTIFICATE OF CORRECTION

PATENT NO. : 7,110,177 B2
APPLICATION NO. : 10/347286
DATED : September 19, 2006
INVENTOR(S) : Youichirou Sugino et al.

It is certified that error appears in the above-identified patent and that said Letters Patent is hereby corrected as shown below:

Col. 24, lines 13-19
Claim 30
The phrase "wherein the polarizing film comprises a stretched film," is changed into --wherein a dichroic material is absorbed in the stretched film,-- on column 24, line 14 to 20.

Signed and Sealed this

Ninth Day of January, 2007

JON W. DUDAS
*Director of the United States Patent and Trademark Office*